Feb. 4, 1930.  H. S. PIERCE  1,745,710
WINDSHIELD
Filed July 16, 1927  2 Sheets-Sheet 1
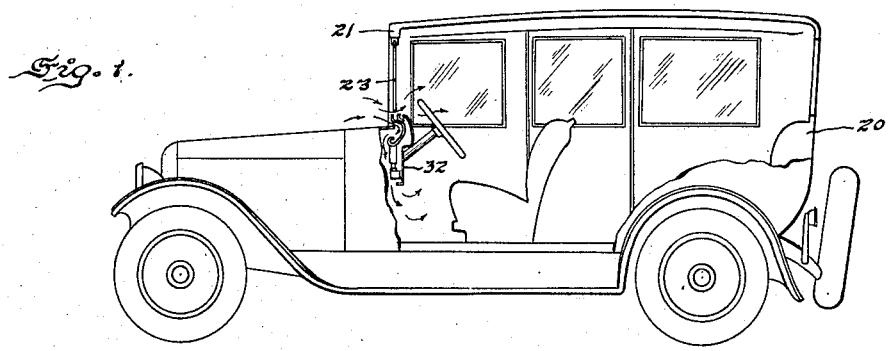
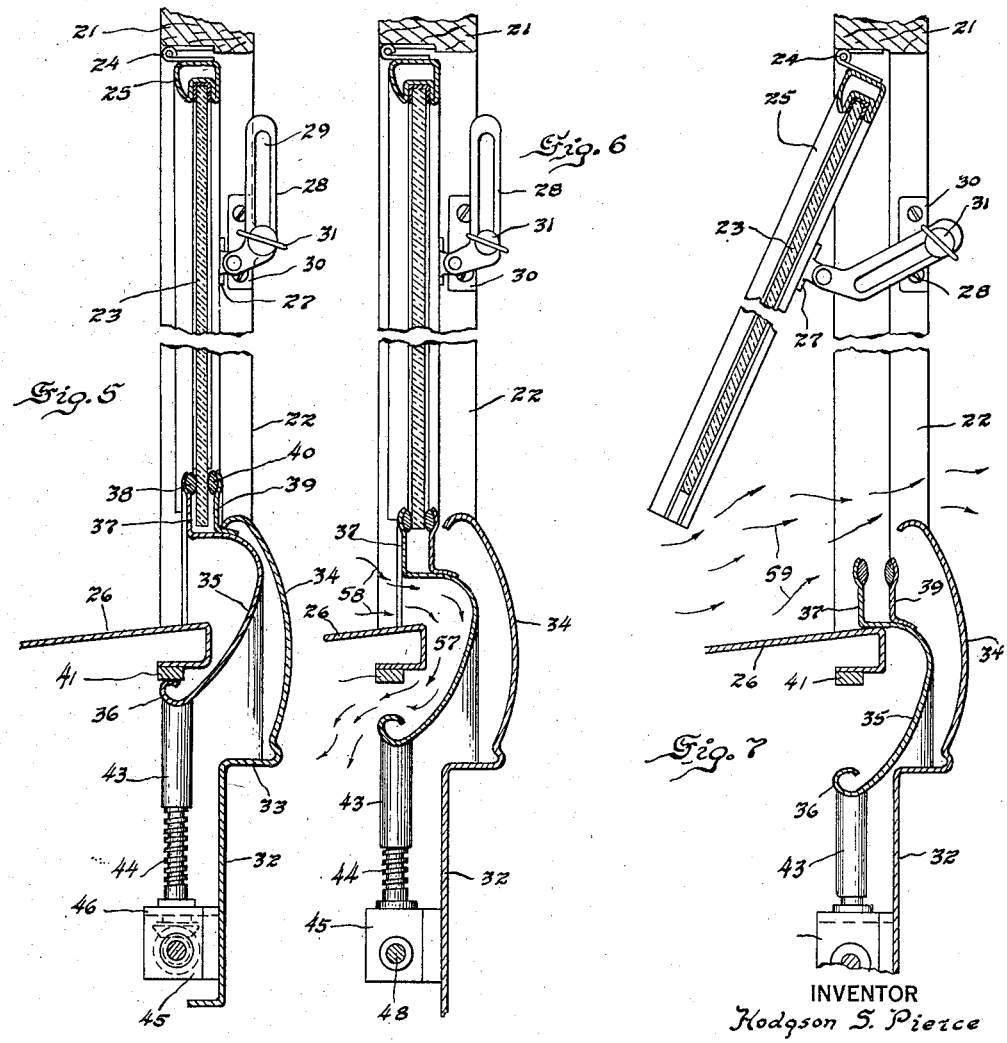
INVENTOR
Hodgson S. Pierce
BY
P. N. Pomeroy
ATTORNEY Feb. 4, 1930.         H. S. PIERCE              1,745,710
                       WINDSHIELD
                    Filed July 16, 1927     2 Sheets-Sheet  2
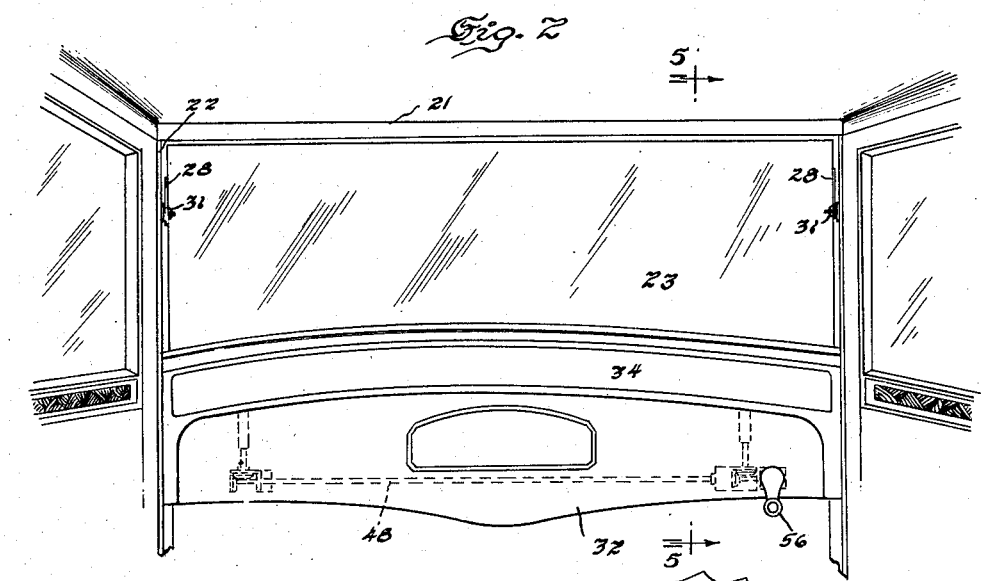
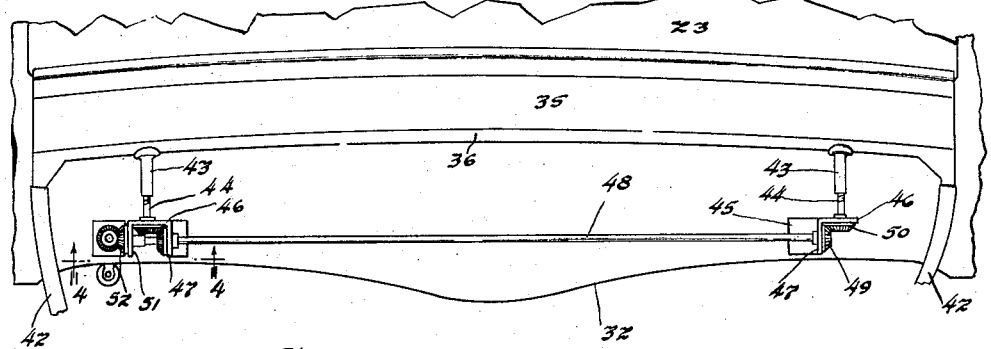
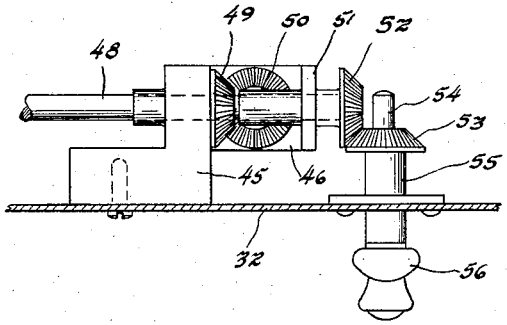
INVENTOR
Hodgson S. Pierce
BY
ATTORNEY Patented Feb. 4, 1930

1,745,710

UNITED STATES PATENT OFFICE

HODGSON S. PIERCE, OF DETROIT, MICHIGAN, ASSIGNOR TO THE STUDEBAKER CORPORATION, OF DETROIT, MICHIGAN, A CORPORATION OF NEW JERSEY

WINDSHIELD

Application filed July 16, 1927. Serial No. 206,199.

This invention relates to vehicle bodies, and particularly to the windshields thereof, the principal object being to provide a vehicle body with a ventilating windshield composed of a pivoted portion and a vertically movable portion normally engageable therewith.

Another object is to provide a vehicle body with a ventilating windshield having a pivoted portion and a vertically movable portion whereby a ventilating passage-way is provided by lowering the vertically movable portion out of engagement with the body cowl.

Another object is to provide a vehicle body having a cowl, with a ventilating windshield comprising a swingable portion spaced above the cowl and a vertically movable portion normally bridging the space between the cowl and the swingable portion, movement of the vertically movable portion providing a passage-way for air to enter the vehicle body forwardly of the instrument panel and below the cowl thereof.

Another object is to provide a vehicle body having a cowl and an instrument panel spaced rearwardly therefrom with a ventilating windshield comprising a pivoted portion spaced above the rear edge of the cowl and a vertically movable portion positioned between the cowl and instrument panel to normally bridge the space betweene the cowl and pivoted windshield portion, certain downward movement of the vertically movable portion exposing a passage-way for the entrance of air into the vehicle body forward of the instrument panel and below the cowl, and further downward movement of the vertically movable portion allowing the pivoted windshield portion to be swung outwardly for air to enter the vehicle body above the cowl and above the instrument panel.

These being among the objects of the present invention, the same consists of certain features of construction and combinations of parts to be hereinafter described with reference to the accompanying drawings and then claimed, having the above and other objects in view.

In the accompanying drawings, which illustrate a suitable embodiment of the present invention, Figure 1 is a diagrammatic longitudinal section of a motor vehicle showing the passage of air through the passage-way provided by the vertically movable portion of the windshield.

Figure 2 is a transverse view of the body looking toward the front thereof, showing the windshield and instrument panel.

Figure 3 is an elevation looking toward the back of the instrument panel, showing the vertically movable windshield portion and the operating mechanism therefor.

Figure 4 is a section taken on the line 4—4 of Figure 3, showing a portion of the windshield operating mechanism.

Figure 5 is a section taken on the line 5—5 of Figure 2, showing the windshield in closed position.

Figure 6 is a section similar to Figure 5, showing the vertically movable windshield portion in partially lowered position for the entrance of air into the body.

Figure 7 is a section similar to Figure 5, showing the vertically movable portion in completely lowered position and the windshield swung forward so that air may enter the vehicle body above the instrument panel.

Referring to the accompanying drawings, in which like numerals refer to like parts throughout the several views, and particularly to Figures 2 and 5, the top front cross member 21 which extends transversely of the vehicle body 20 and which is secured at its ends to the body pillars 22, swingably supports a pivoted portion 23 of the windshield by means of a conventional piano hinge 24 secured thereto and to the upper portion of the glass retaining channel 25. The lower edge of the windshield portion 23 is not retained by the window channel and is spaced above the rear edge of the body cowl panel 26 in its normal closed position as shown in Figure 5. Pivoted to the sides of the glass retaining channel 25 by brackets 27 are adjusting quadrants 28 having longitudinal slots 29 which receive thumb screws 31 which are threaded into the brackets 30, attached to the body posts 22. The thumb screws 31 which bear against the sides of the quadrants 28 are threaded into the brackets 30 so that when the windshield portion 23 is swung outwardly to a position such as that shown in Figure 7, the screws 31 may be turned to force the quadrants 28 against the brackets 30 to hold the windshield portion 23 in adjusted pivoted position.

The instrument panel 32 secured at its ends to the body posts 22 is bent back at its upper edge 33 and then upwardly to provide an ornamental moulding 34 spaced rearwardly of the rear edge of the cowl panel 26, the marginal edge thereof being bent forwardly and positioned somewhat above the rear edge of the cowl panel 26.

Extending transversely of the body 20 and positioned in the space between the moulding 34 and the rear edge of the cowl panel 26, as shown in Figure 5, is the vertically movable portion of the windshield which, in order to facilitate a description of the same, will be called a ventilator shield. This shield comprises a curved main portion 35 spaced rearwardly of the rear edge of the cowl panel 26, a lower portion rolled upwardly to form a trough 36, an upwardly extending upper marginal flange 37 having a weather strip 38 secured thereto engaging the front surface of the windshield portion 23, and a stamping 39 attached thereto parallel to and spaced from the flange 37 which is also provided with a similar weather strip 40 engaging the rear surface of the windshield portion 23. The normal closed position of the ventilating shield is shown in Figure 5 and the rolled marginal edge thereof engages a fibrous strip 41 secured to the lower side of the rear edge of the cowl panel 26 to prevent rain from entering the body 20. Rain which enters the space between the rear edge of the cowl panel 26 and the main portion 35 of the ventilator shield is caught by the trough 36 formed by the lower marginal edge and is conducted to tubes 42 (Figure 3) at the ends thereof where it is discharged below the body floor boards.

The ventilator shield is formed with vertical internally threaded tubular portions 43 at its opposite ends which threadably receive vertical operating screws 44 journaled in and held against longitudinal movement by horizontal portions 46 of the brackets 45 secured to the instrument panel 32. The brackets 45 are provided with vertical portions 47 which receive the ends of a horizontal connecting shaft 48. The ends of the shaft 48 project through the vertical bracket portions 47 and are provided with bevel gears 49 which mesh with bevel gears 50 secured to the ends of the vertical screws 44 projecting through the horizontal bracket portions 46. One of the brackets 45 is formed with a vertical portion 51 parallel to and spaced from the vertical portion 47 which receives a continuation of the shaft 48, the end of which projects therethrough and is provided with a bevel gear 52 which meshes with a similar bevel gear 53 secured to one end of a shaft 54. The shaft 54 is journaled in a support 55 secured to the instrument panel 32 and extends past the inner face of the panel to receive an operating crank 56.

Movement of the crank 56 in the proper direction causes the system of gears and shafts to rotate the threaded shafts 44 which, being threaded into the tubular portions 43 of the ventilator shield, draw the shield downwardly so that its lower marginal edge is brought out of contact with the fibrous strip 41 secured to the lower side of the rear edge of the cowl panel 26 to provide a ventilating passage-way 57. As shown in Figure 6, the ventilator shield has been moved in this manner and air currents indicated by arrows 58 are seen to enter the exposed passage-way 57 and pass into the vehicle body 20 below the cowl panel 26 and forwardly of the instrument panel 32 so that they are directed to enter the same near the bottom of the body interior.

The ventilator shield may be moved still lower, as shown in Figure 7, so that the weather strips 38 and 40 disengage the windshield portion 23 and drop below the bottom edge thereof which allows the windshield portion 23 to be swung outwardly as shown. The air currents 59 in this case now strike the cowl panel 26 and flange 37 and flow into the interior of the body 20 over the top of the instrument panel moulding 34 as the passage-way 57 has been closed by the ventilator shield engaging the top of the rear edge of the cowl panel 26.

Various other positions of the ventilator shield may be obtained by this system, one of which is shown in Figure 1, wherein the shield is so positioned that air currents may enter the body through the passage-way between the cowl 26 and instrument panel 32 as well as over the top of the instrument panel moulding 34.

It is evident from the foregoing description that the present invention incorporates many features which are not employed in ventilating windshields used heretofore and that the same presents a very satisfactory system for providing a vehicle body with different conditions of ventilation.

It is to be understood that the ventilator and pivoted windshield portion are not limited to the exact constructions as shown, and that formal changes may be made in the specific embodiment of the invention described without departing from the spirit and substance of the broad invention, the scope of which is commensurate with the appended claims.

What I claim is:

1. In a vehicle body having a cowl, a windshield therefor comprising a pivoted member and a vertically movable member normally engageable therewith, said vertically movable member having a central portion spaced from and a lower portion normally engageable with the rear edge of said cowl.

2. In a vehicle body having a cowl, a windshield therefor comprising a pivoted member having its lower edge spaced above said cowl, a vertically movable member normally engageable with said pivoted member and having a central portion spaced from and a lower portion normally engageable with the rear edge of said cowl, and means for lowering said vertically movable member out of engagement with said cowl to provide a passage-way below said pivoted member and between said vertically movable member and said rear cowl edge for the passage of air into said body.

3. In a vehicle body having a cowl and a body cross member above said cowl, a windshield therefor comprising a member pivoted to said cross member and having its lower edge spaced above said cowl, a vertically movable member normally engageable with said pivoted member and having a central portion spaced from the rear edge of said cowl and a lower portion normally engageable with the rear edge of said cowl, and mechanism for lowering said vertically movable member out of engagement with said cowl edge and said pivoted member to provide a passage-way between said cowl and said vertically movable member and to provide a passage-way between the lower edge of said pivoted member and said cowl whereby air may enter said body through said passageways.

4. In a vehicle body having a cowl and a body cross member above said cowl, a windshield therefor comprising a member pivoted thereto, a vertically movable member normally engageable with said pivoted member and having a curved central portion spaced from the rear edge of said cowl and a lower portion curved upwardly to normally engage the lower side of said cowl edge, and manually operable screw means for moving said vertically movable member in a downward direction out of engagement with said cowl edge and said first-mentioned windshield member to allow pivotal movement of said member for providing a passage-way for the passage of air between said vertically movable member and said first mentioned windshield member.

5. In a vehicle body having a cowl and an instrument panel spaced from the rear edge thereof, a windshield comprising a transparent pivoted member and a sheet metal vertically movable member positioned between said instrument panel and said cowl in spaced relationship to the rear edge of said cowl, said vertically movable member being formed with an upper portion normally slidably engaging said pivoted member and a lower portion normally engaging the lower side of said cowl rear edge, and manually operated screw means for moving said vertically movable member in a downward direction out of engagement with said cowl and said pivoted member to allow said pivoted member to be pivoted and to provide a passage-way between said cowl rear edge and said vertically movable member whereby air may flow through said passage-way and enter said body below said instrument panel, and whereby air may flow between said pivoted member and said vertically movable member to enter said body above said instrument panel.

6. In a vehicle body having a cowl and an instrument panel spaced rearwardly therefrom, a windshield therefor comprising a pivoted portion spaced above the rear edge of said cowl, and a vertically movable portion normally bridging the space between said cowl and said pivoted portion, certain downward movement of said vertically movable portion exposing a passage-way for air to enter said body below said cowl and instrument panel and further downward movement of said vertically movable portion allowing said pivoted windshield portion to be pivoted to permit air to enter said body above said cowl and said instrument panel.

7. In a vehicle body having a cowl, a windshield therefor comprising a transparent sheet pivoted at its upper edge, and a vertically movable sheet metal member normally engageable with the lower edge of said sheet, said sheet metal member having a central portion spaced from said cowl and a lower portion normally engageable with the rear edge of said cowl.

8. In a vehicle body having a cowl, the combination with a windshield therefor comprising a transparent sheet pivoted at its upper edge, a sheet metal member slidable in substantially a vertical plane normally engageable with the lower edge of said sheet, said sheet metal member being adapted to move downwardly in said cowl to clear said sheet whereby the same may be swung outwardly to a ventilating position.

9. In a vehicle body having a cowl, a windshield therefor comprising a transparent sheet pivoted at its upper edge, a vertically movable member having a pair of upwardly projecting flanges normally receiving the lower edge of said sheet therebetween and a lower flange normally engageable with said cowl, and means for moving said member downwardly so that said upper flanges are out of contact with said sheet and said lower flange is out of contact with said cowl.

10. In a vehicle body having a cowl, a windshield therefor comprising a pivoted transparent sheet having its lower edge spaced from said cowl, a vertically movable member normally closing the space above said cowl and having an upwardly projecting portion normally in contact with said transparent sheet, and means for moving said member out of contact with said sheet and to provide an air passage around the rear edge of said cowl.

Signed by me at Detroit, Michigan, this 11th day of July, 1927.

HODGSON S. PIERCE.